(12) United States Patent
Jailani

(10) Patent No.: US 11,316,904 B2
(45) Date of Patent: Apr. 26, 2022

(54) NETWORK SWITCHES WITH SECURED SWITCH PORTS TO BASEBOARD MANAGEMENT CONTROLLERS

(71) Applicant: SUPER MICRO COMPUTER, INC., San Jose, CA (US)

(72) Inventor: Sahul Hameed Abdul Kader Jailani, San Jose, CA (US)

(73) Assignee: SUPER MICRO COMPUTER, INC., San Jose, CA (US)

( * ) Notice: Subject to any disclaimer, the term of this patent is extended or adjusted under 35 U.S.C. 154(b) by 50 days.

(21) Appl. No.: 16/843,752

(22) Filed: Apr. 8, 2020

(65) Prior Publication Data
US 2020/0344269 A1 Oct. 29, 2020

Related U.S. Application Data

(60) Provisional application No. 62/838,463, filed on Apr. 25, 2019.

(51) Int. Cl.
*H04L 41/0806* (2022.01)
*H04L 69/16* (2022.01)
(Continued)

(52) U.S. Cl.
CPC .......... *H04L 63/20* (2013.01); *G06F 11/3058* (2013.01); *G06F 11/3096* (2013.01); *H04L 29/06911* (2013.01); *H04L 41/0806* (2013.01); *H04L 61/6063* (2013.01); *H04L 63/0236* (2013.01); *H04L 63/1416* (2013.01); *H04L 63/1458* (2013.01); *H04L 69/161* (2013.01); *H04W 80/04* (2013.01)

(58) Field of Classification Search
CPC ............ G06F 11/3058; G06F 11/3096; H04L 29/06911; H04L 41/0806; H04L 61/6063; H04L 63/0236; H04L 63/1416; H04L 63/1458; H04L 63/20; H04L 69/161; H04W 80/04
See application file for complete search history.

(56) References Cited

U.S. PATENT DOCUMENTS 8,417,774 B2 * 4/2013 Flynn .................... G06F 13/426
709/204
8,732,829 B2 * 5/2014 Johnson ................ G06F 21/552
726/23

(Continued)

OTHER PUBLICATIONS

Edward Tetz. "Network Basics: TCP/UDP Socket and Port Overview", Cisco Networking All-In-One for Dummies, publicly posted as of Jun. 13, 2018, 3 pages. (Year: 2018).*

*Primary Examiner* — George C Neurauter, Jr.
(74) *Attorney, Agent, or Firm* — Patrick D. Benedicto

(57) ABSTRACT

A server management switch discovers and identifies its switch ports that are connected to communication ports of baseband management controllers (BMC's) of server computers. The server management switch isolates the identified BMC-connected switch ports such that network traffic on a BMC-connected switch port is restricted to a switch port that has a connection, either directly by a link or over a server management network, to a server management computer. Network traffic on BMC-connected switch ports are monitored and controlled in various ways to further protect the BMC's from security attacks.

12 Claims, 4 Drawing Sheets

(51) Int. Cl.
*H04L 101/663* (2022.01)
*H04W 80/04* (2009.01)
*G06F 11/30* (2006.01)
*H04L 9/40* (2022.01)
*H04L 29/06* (2006.01)

(56) References Cited

U.S. PATENT DOCUMENTS

| | | | | |
|---|---|---|---|---|
| 9,191,823 | B2* | 11/2015 | Rieger | H04W 12/12 |
| 9,800,547 | B2* | 10/2017 | Lee | H04L 63/0245 |
| 9,807,055 | B2* | 10/2017 | Lee | H04L 63/1441 |
| 9,916,270 | B2* | 3/2018 | Richardson | G06F 13/4282 |
| 9,998,359 | B2* | 6/2018 | Itkin | H04L 45/245 |
| 10,069,718 | B2* | 9/2018 | Khemani | H04L 25/00 |
| 10,148,746 | B2* | 12/2018 | Itkin | H04L 41/04 |
| 10,911,405 | B1* | 2/2021 | Harland | H04L 63/0227 |
| 2005/0286430 | A1* | 12/2005 | Koga | H04L 69/324 |
| | | | | 370/241 |
| 2014/0165183 | A1* | 6/2014 | Dharmadhikari | H04L 63/0227 |
| | | | | 726/13 |
| 2014/0344431 | A1* | 11/2014 | Hsu | H04L 41/0213 |
| | | | | 709/223 |
| 2015/0156212 | A1* | 6/2015 | Khatri | H04L 63/1416 |
| | | | | 726/23 |
| 2016/0170923 | A1* | 6/2016 | Kutch | G06F 13/4282 |
| | | | | 710/313 |
| 2016/0248697 | A1* | 8/2016 | Masuyama | H04L 41/0668 |
| 2016/0308886 | A1* | 10/2016 | Lee | H04L 63/1441 |
| 2017/0109531 | A1* | 4/2017 | Wang | H04L 9/3234 |
| 2017/0155573 | A1* | 6/2017 | Khemani | H04L 25/00 |
| 2017/0244640 | A1* | 8/2017 | Lin | H04L 67/1004 |
| 2018/0183758 | A1* | 6/2018 | Itkin | H04L 41/28 |
| 2019/0004901 | A1* | 1/2019 | Ryan | G06F 13/20 |
| 2019/0273700 | A1* | 9/2019 | Itkin | H04L 49/254 |
| 2020/0278935 | A1* | 9/2020 | Borikar | G06F 12/12 |

* cited by examiner

NETWORK SWITCHES WITH SECURED SWITCH PORTS TO BASEBOARD MANAGEMENT CONTROLLERS

CROSS-REFERENCE TO RELATED APPLICATION

This application claims the benefit of U.S. Provisional Application Ser. No. 62/838,463, filed on Apr. 25, 2019, which is incorporated herein by reference in its entirety.

BACKGROUND OF THE INVENTION

1. Field of the Invention

The present invention relates generally to computer networks, and more particularly but not exclusively to network switches.

2. Description of the Background Art

A computer may have a communication port that may be linked to a communication port of another computer. For example, a server computer may have a communication port in the form of a network interface card (NIC) port. The server computer may send and receive network traffic by way of its communication port.

A server computer may also have a service processor, such as a baseboard management controller (BMC). Generally speaking, a BMC is a special-purpose processor that monitors the physical state of the server computer. The BMC may include sensors for measuring the physical condition of the computer, such as power supply voltage, fan speed, internal chassis temperature, etc. The BMC operates largely independent of the central processing unit (CPU) and operating system (OS) of the server computer. The BMC has a dedicated communication port for communicating with a remote server management computer. The communication port of the BMC is separate from communication ports that are employed by the server computer for general communications with other computers.

SUMMARY

In one embodiment, a server management switch discovers and identifies its switch ports that are connected to communication ports of baseband management controllers (BMC's) of server computers. The server management switch isolates the identified BMC-connected switch ports such that network traffic on a BMC-connected switch port is restricted to a switch port that has a connection, either directly by a link or over a server management network, to a server management computer. Network traffic on BMC-connected switch ports are monitored and controlled in various ways to further protect the BMC's from security attacks.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
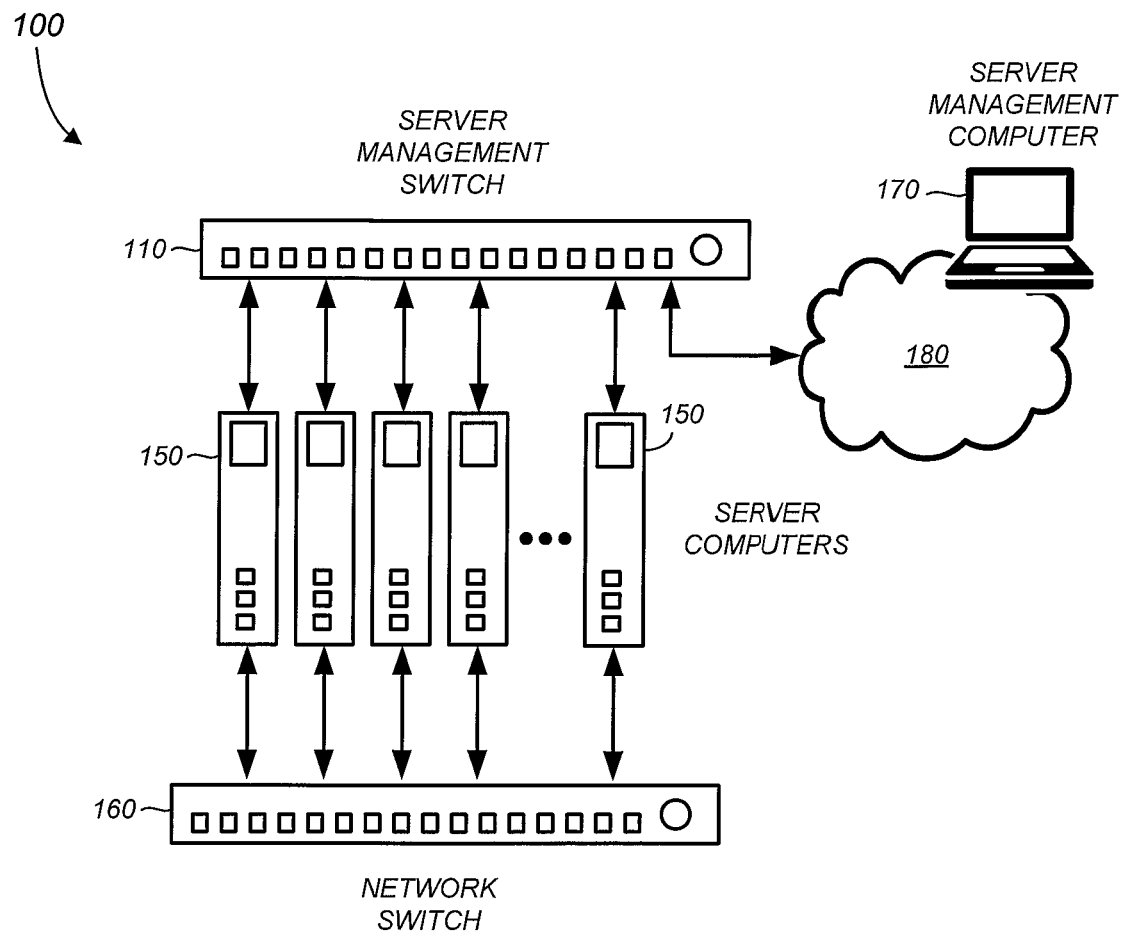
FIG. 1 is a logical diagram of a computer network in accordance with an embodiment of the present invention.

FIG. 1 is a logical diagram of a computer network 100 in accordance with an embodiment of the present invention. The computer network 100 is a private computer network in that it is owned and operated by a private entity and is not accessible to the general public. In the example of FIG. 1, the computer network 100 comprises one or more server computers 150, one or more network switches 160, a server management switch 110, and a server management computer 170.

A server computer 150 may comprise a conventional server computer, such as those available from Super Micro Computer, Inc. of San Jose, Calif. For example, the server computers 150 may comprise rack mount servers or blade servers. A server computer 150 may have a communication port, such as a NIC port, for communicating with other server computers 150. More particularly, the communication ports of the server computers 150 may be connected to switch ports of one or more network switches 160. Network traffic (i.e., data being communicated) from an originating server computer 150 to a receiving server computer 150 may be forwarded by a network switch 160. A network switch 160 may be a conventional network switch, such as those available from Super Micro Computer, Inc., Cisco Systems, Inc., and other network device vendors. Generally speaking, a network switch is a dedicated network device for receiving and forwarding data packets by packet switching. A network switch may receive network traffic from an originating computer on a switch port, and route/forward the network traffic to a destination computer on another switch port.

In the example of FIG. 1, the computer network 100 includes a server management switch 110. In one embodiment, the server management switch 110 has the functionalities of a conventional network switch, plus additional functionalities that allow the server management switch 110 to provide improved security to service processor, such as BMC's (see FIG. 2, BMC 153) of server computers 150. In one embodiment, the server management switch 110 is configured to discover and identify its BMC-connected switch ports (i.e., switch ports that are connected to BMC communication ports of BMC's), isolate each identified BMC-connected switch port, and monitor and control network traffic on each BMC-connected switch port.

A server management computer 170 may be configured to perform server management functions for the server computers 150. The server management computer 170 may be a conventional computer that is running a commerciallyavailable system management software (SMS) for managing server computers. A difference between the server management computer 170 and other computers is that the server management computer 170 communicates with one or more BMC's intermittently or periodically to manage the corresponding server computers 150.

The server management computer 170 may be connected to the server management switch 110 directly by a link or indirectly over a server management network 180. The server management network 180 may be configured to carry all server management network traffic in the network 100, i.e., network traffic between the server management computer 170 and BMC's of server computers 150. The server management network 180 may include other switches and network devices (not shown) that provide network connection between the server management switch 110 and the server management computer 170.

Figure 2:
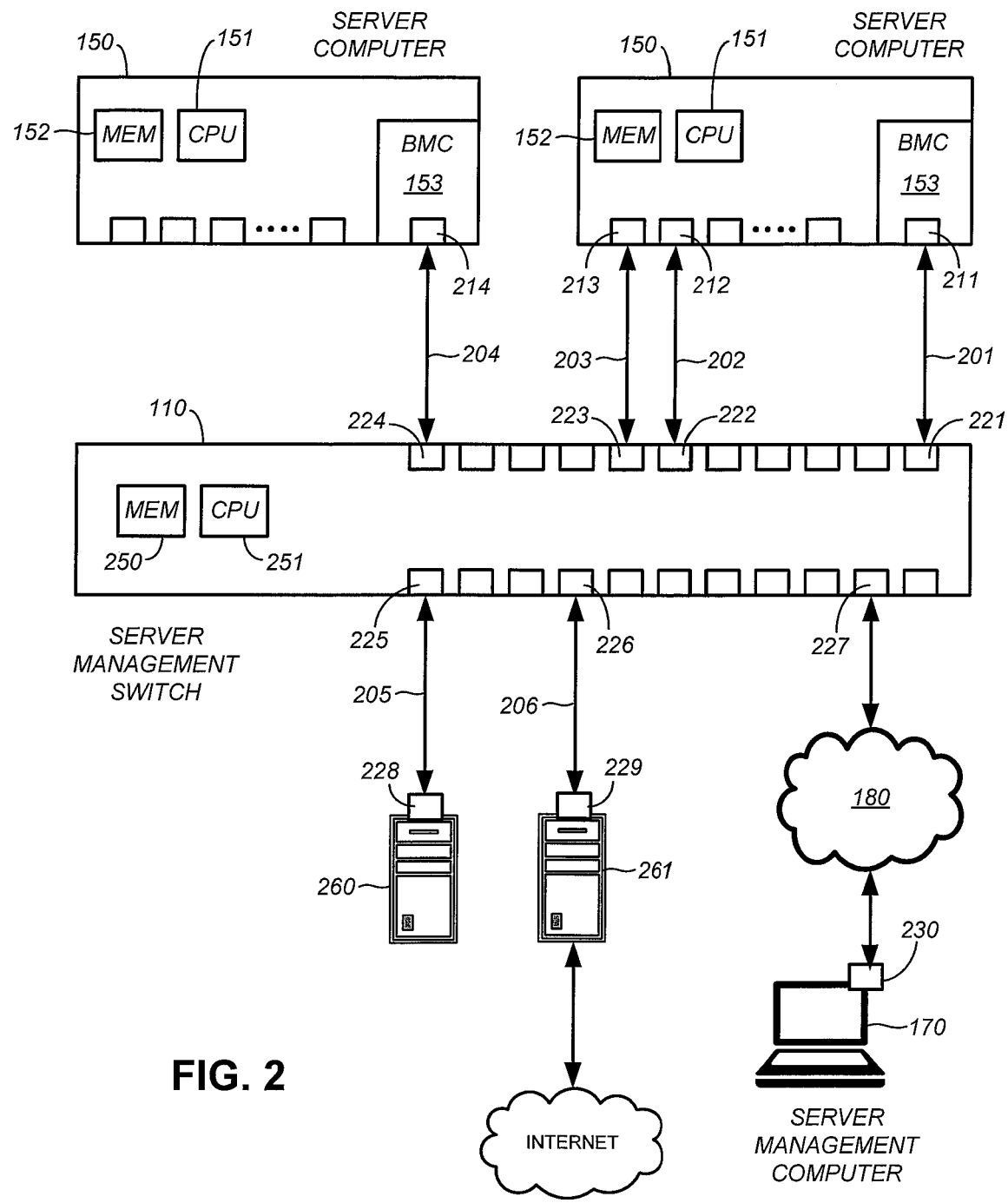
FIG. 2 is a physical connection diagram of a server management switch, in accordance with an embodiment of the present invention.

FIG. 2 is a physical connection diagram of the server management switch 110, in accordance with an embodiment of the present invention.

In the example of FIG. 2, a server computer 150 has a CPU 151, a memory 152, and a BMC 153. As noted, the BMC 153 is a specialized service processor that is distinct from the CPU 151. A BMC 153 has a communication port, referred to herein as "BMC communication port", that is separate from a data communication port (e.g., NIC port) that the server computer 150 uses for general communication with other computers. The BMC communication port (e.g., FIGS. 2, 211 and 214) is used by the BMC 153 to communicate exclusively with the server management computer 170 or other remote computer that performs server management/monitoring of the server computer 150 independent of the CPU 151. In one embodiment, the BMC 153 communicates with the server management computer 170 in accordance with the Intelligent Platform Management Interface (IPMI) specification. In another embodiment, the BMC 153 communicates with the server management computer 170 in accordance with the Redfish standard defined by the Distributed Management Task Force (DMTF).

In the example of FIG. 2, the server management switch 110 comprises a plurality of switch ports 221-227, a CPU 251, and a memory 250. It is to be noted that some switch ports of the server management switch 110 and communication ports of the server computers 150 are not labeled for clarity of illustration. The switch ports 221 and 224 are also referred to as "BMC-connected switch ports" in that they are connected to corresponding BMC's 153 by links 201 and 204, respectively.

A link is a physical connection that directly connects a switch port of a network switch to a communication port of a computer. A link may comprise an Ethernet cable, a backplane connection, or other wired connection. In the example of FIG. 2, the link 201 connects the switch port 221 of the server management switch 110 to a BMC communication port 211 of a BMC 153. Similarly, the link 204 connects a switch port 224 of the server management switch 110 to a BMC communication port 214 of another BMC 153.

In one embodiment, the server management switch 110 is configured to perform switching or routing not just for BMC's, but for general data communication ports as well. This is reflected in FIG. 2, where a link 202 connects a communication port 212 of a server computer 150 to a switch port 222, and a link 203 connects a communication port 213 of the server computer 150 to a switch port 223.

In the example of FIG. 2, a link 205 connects a switch port 225 to a communication port 228 of a computer 260 and a link 206 connects a switch port 226 to a communication port 229 of a computer 261. The communication ports 212, 213, 228, and 229 may be NIC ports, for example.

A switch port 227 of the server management switch 110 has a connection directly or indirectly to the server management computer 170. For example, a link may directly connect the switch port 227 to a communication port 230 (e.g., NIC port) of the server management computer 170. In the example of FIG. 2, the switch port 227 is depicted as being indirectly connected to the server management computer 170 over the server management network 180. That is, the switch port 227 has a network connection to the server management computer 170.

In one embodiment, switch ports that are connected to BMC communication ports are isolated from switch ports that have no connection to the server management computer 170. That is, network traffic on a BMC-connected switch port is restricted to a particular switch port, such as only to and from a switch port that has a connection to the server management computer 170. Any other switching or routing to or from the BMC-connected switch port will be blocked by the server management switch 110. More particularly, the server management switch 110 blocks switching or routing of network traffic between a switch port connected to a BMC communication port and another switch port that is not connected to the server management computer 170. A network administrator may manually indicate, e.g., using a menu or other user interface, that the switch port 227 is connected to the server management computer 170 as part of a user-configured setting of the server management switch 110.

In the example of FIG. 2, the server management switch 110 may be automatically configured to only allow connection between the switch port 224 and the switch port 227. Similarly, the server management switch 110 may be automatically configured to only allow connection between the switch port 221 and the switch port 227. All other connections to the BMC-connected switch ports 224 and 221 are blocked by the server management switch 110. This way, a BMC 153 cannot be accessed from a computer that is not connected to the switch port 227. A BMC 153 is thus advantageously protected from unauthorized access, especially over the Internet through the computer 261, for example.

Figure 3:
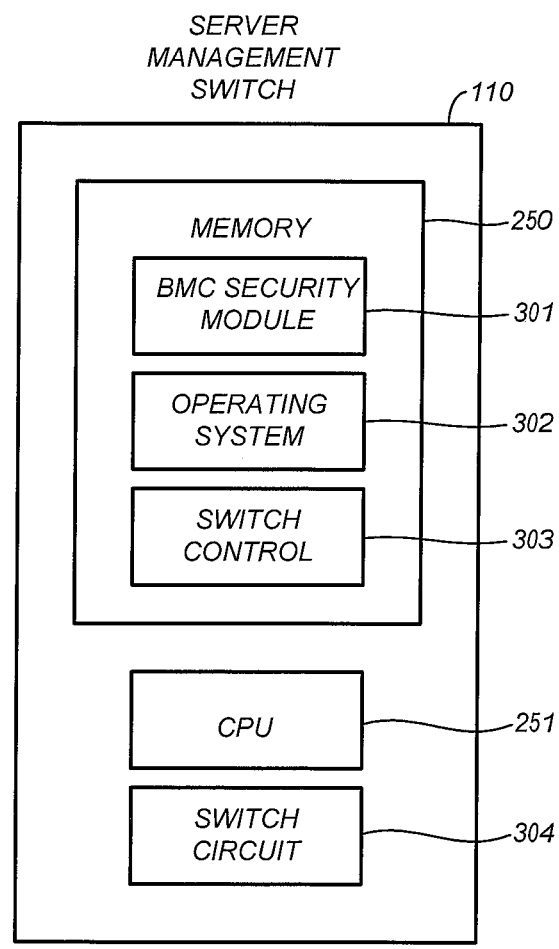
FIG. 3 is a logical diagram of a server management switch in accordance with an embodiment of the present invention.

FIG. 3 is a logical diagram of the server management switch 110 in accordance with an embodiment of the present invention. The server management switch 110 is a network switch with the added functionality of protecting BMC-connected switch ports. In the example of FIG. 3, the server management switch 110 comprises the CPU 251, the memory 250, and a switch circuit 304. The switch circuit 304 may comprise switch ports, switching matrixes, and other switching hardware of a conventional network switch.

In the example of FIG. 3, the BMC security module 301, operating system 302, and switch control module 303 may comprise instructions that are executed by the CPU 251. The switch control module 303 is configured to control the switch circuit 304 to perform switching/routing functions. The operating system 302 (e.g., LINUX operating system) and the switch control module 303 may comprise software modules of a conventional network switch.

The BMC security module 301 may comprise instructions that, when executed by the CPU 251, cause the server management switch 110 to discover and identify BMC-connected switch ports, isolate the BMC-connected switch ports, and monitor and control network traffic on each BMC-connected switch port.

Figure 4:
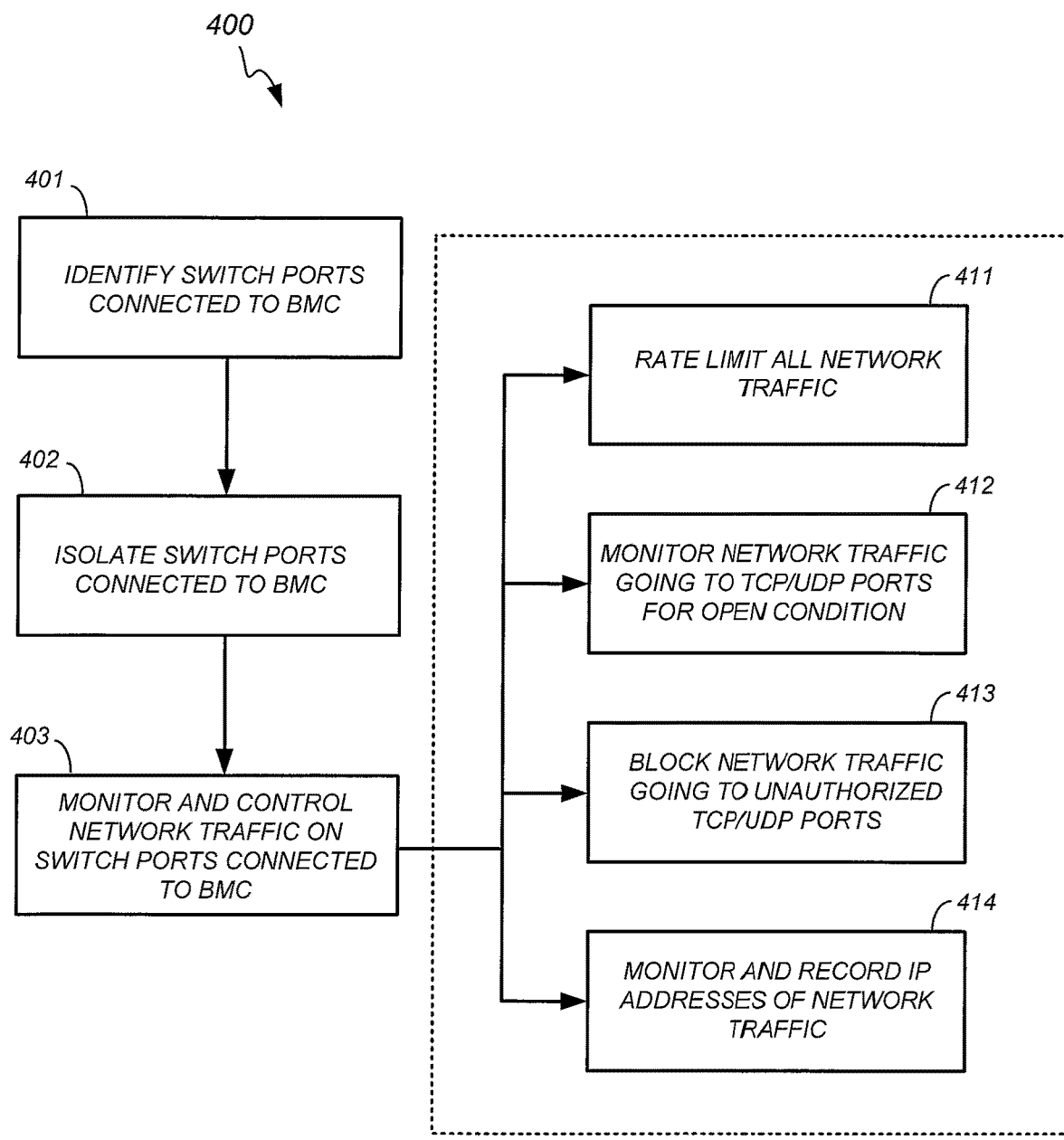
FIG. 4 is a flow diagram of a method of securing network traffic of a service processor of a server computer in accordance with an embodiment of the present invention.

FIG. 4 is a flow diagram of a method 400 of securing network traffic of a service processor of a server computer in accordance with an embodiment of the present invention. The method 400 may be performed by the BMC security module 301 to secure BMC's that are connected to the server management switch 110. The method 400 may also be implemented using other components without detracting from the merits of the present invention.

In the example of FIG. 4, the server management switch 110 discovers and identifies switch ports of the server management switch 110 that are connected to BMC communication ports (step 401). For example, the server management switch 110 may be configured to perform a BMC discovery procedure in accordance with the IPMI specification or by using Simple Service Discovery Protocol (SSDP). The BMC discovery procedure allows the server management switch 110 to identify one or more of its BMC-connected switch ports.

The server management switch 110 isolates each of its BMC-connected switch ports (step 402). More specifically, the server management switch 110 may automatically perform a port isolation procedure for each identified BMC-connected switch port. The port isolation procedure restricts network traffic such that network traffic to and from a BMC-connected switch port can only originate from or be destined to a switch port that is connected to the server management computer 170. The port isolation may be enforced a variety of ways depending on the particulars of the server management switch 110. In one of embodiment, port isolation is performed by modifying an egress mask table in an application specific integrated circuit (ASIC) of the server management switch 110. The egress mask table indicates whether a particular egress switch port can transmit packets that are received on a particular ingress switch port. By default, all switch ports will have the egress mask bits enabled for all the ingress switch ports. Based on the required port isolation, the egress mask of a switch port (e.g., FIG. 2, switch port 221) may be modified so that the switch port can only transmit out packets originally received on certain ingress ports (e.g., FIG. 2, switch port 227).

Referring to FIG. 2 as an example, port isolation may be performed so that network traffic can flow between the switch port 224 and the switch port 227, and between the switch port 221 and the switch port 227. All other network traffic connections to the switch ports 224 and 221 are blocked by the server management switch 110. In that example, network traffic received on the switch ports 222, 223, 225, or 226 cannot be transmitted out from the switch port 221 or 224. Only network traffic received on the switch port 227 can be transmitted out from the switch port 221 or 224.

Continuing the method 400 of FIG. 4, the server management switch 110 monitors and controls network traffic on each identified BMC-connected switch port (step 403). The step of monitoring and controlling network traffic on each BMC-connected switch port provides an additional layer of security. The following steps 411-414 provide examples of such monitoring and controlling of network traffic.

The server management switch 110 may automatically rate limit all network traffic on BMC-connected switch ports (step 411). This protects a BMC 153 from excessive network traffic and other security attacks that may overwhelm the capacity of the BMC 153 to respond. In one embodiment, the server management switch 110 has preconfigured default permissible rates for each type of allowed network traffic. The server management switch 110 may also allow user configurations to override these permissible rates. The server management switch 110 may be configured to identify a BMC-connected switch port that tries to send or receive network traffic exceeding the permissible rate by an abnormal margin. The server management switch 110 may, as part of its alert mechanism, report such identified BMC-connected switch ports to the server management computer 170 or to any other device that is configured to be alerted in the event of a detected network anomaly.

As is well-known, Transport Control Protocol (TCP) and User Datagram Protocol (UDP) are in so-called transport layer of network traffic. A BMC 153 may use various TCP or UDP ports to communicate with the server management computer 170 for different types of network traffic. The server management switch 110 may be configured to monitor all of the open TCP/UDP ports in BMC's 153 (step 412). The server management switch 110 may detect any unexpected TCP/UDP port opened in the BMC's 153 and raise a corresponding alert in response thereto. The alert may include sending a warning or report to the server management computer 170 or to any other device that is configured to receive such alerts. The server management switch 110 may also be configured to raise an alert in response to detecting any abnormal closure of TCP/UDP ports that are expected to be open. TCP/UDP ports that are expected to be open and/or authorized may be user-configurable and indicated in a table for reference.

The server management switch 110 may be configured to block all network traffic on a BMC-connected switch port that goes to unauthorized TCP/UDP ports of BMC's 153 (step 413). This protects a BMC 153 from security attacks originating from the Internet, and prevents any compromised BMC 153 from sending out abnormal traffic by opening unknown TCP/UDP ports. The server management switch 110 may also be configured to block network traffic to particular, predetermined TCP/UDP ports of BMC's 153.

The server management switch 110 may be configured to monitor and record Internet Protocol (IP) addresses of network traffic on BMC-connected switch ports (step 414).

The server management switch 110 may be configured to generate various alerts, such as warnings and reports, as part of the method 400 when any abnormal network behavior is detected from a BMC-connected switch port. The server management switch 110 may send these alerts to the server management computer 170 or to any other device configured to receive them.

Network switches with secured BMC-connected switch ports have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of securing a switch port of a network switch, the method comprising:

identifying, from among a plurality of switch ports of a network switch, a first switch port that is directly connected to a baseboard management controller (BMC) communication port of a BMC of a first server computer, wherein a second switch port of the plurality of switch ports is directly connected to a network interface card (NIC) port of the first server computer, and a third switch port of the plurality of switch ports is directly connected to a NIC port of a second server computer;

isolating the first switch port such that all network traffic on the first switch port is restricted to a fourth switch port of the plurality of switch ports that is connected to a server management computer, the server management computer being configured to communicate with the BMC of the first server computer; and blocking, within the network switch, all network traffic that is exiting the first switch port but has not been received on the fourth switch port.

2. The method of claim 1, wherein the server management computer is directly connected to the fourth switch port by way of a wired link.

3. The method of claim 1, wherein the server management computer is connected to the fourth switch port over a computer network.

4. The method of claim 1, further comprising:
rate-limiting all network traffic on the first switch port.

5. The method of claim 1, further comprising:
blocking all network traffic that goes to a predetermined Transport Control Protocol/User Datagram Protocol (TCP/UDP) port of the BMC of the first server computer.

6. The method of claim 1, further comprising:
blocking all network traffic on the first switch port that is going to a TCP/UDP port, of the BMC of the first server computer, that is not authorized to be open.

7. The method of claim 1, further comprising:
recording Internet protocol (IP) addresses of all network traffic on the first switch port.

8. A server management switch of a computer network, the server management switch comprising:
a first switch port of a plurality of switch ports, the first switch port being directly connected to a baseboard management controller (BMC) communication port of a BMC of a first server computer of a plurality of server computers of the computer network;
a second switch port of the plurality of switch ports, the second switch port being directly connected to a data communication port of the first server computer;
a third switch port of the plurality of switch ports, the third switch port being directly connected to a data communication port of a second server computer of the plurality of server computers; and
a fourth switch port of the plurality of switch ports, the fourth switch port being connected to a server management computer that is configured to perform management of the plurality of server computers, the server management computer being configured to communicate with BMC's of the plurality of server computers,
wherein the server management switch is configured to identify which ones of the plurality of switch ports are connected to the BMC's of the plurality of server computers and, in response to identifying the first switch port as being directly connected to the BMC communication port of the BMC of the first server computer, to block any network traffic that has not been received on the fourth switch port from exiting the first switch port.

9. The server management switch of claim 8, wherein the server management switch, in response to identifying the first switch port as being directly connected to the BMC communication port of the BMC of the first server computer, is configured to rate limit all network traffic on the first switch port.

10. The server management switch of claim 8, wherein the server management switch, in response to identifying the first switch port as being directly connected to the BMC communication port of the BMC of the first server computer, is configured to block all network traffic that goes to predetermined Transport Control Protocol/User Datagram Protocol (TCP/UDP) ports of the BMC of the first server computer.

11. The server management switch of claim 8, wherein the fourth switch port is directly connected to the, server management computer.

12. The server management switch of claim 8, wherein the fourth switch port is connected to the server management computer over a server management network.

\* \* \* \* \*